United States Patent
Rusman et al.

(10) Patent No.: US 7,809,583 B2
(45) Date of Patent: Oct. 5, 2010

(54) LICENSE ACTIVATION FOR PRELOADED SOFTWARE

(75) Inventors: Mujianto Rusman, Round Rock, TX (US); David Michael, Round Rock, TX (US); Katherine Reichert, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 959 days.

(21) Appl. No.: 11/315,046

(22) Filed: Dec. 22, 2005

(65) Prior Publication Data
US 2007/0150294 A1     Jun. 28, 2007

(51) Int. Cl.
*G06Q 90/00* (2006.01)
(52) U.S. Cl. ....................................................... 705/1.1
(58) Field of Classification Search ....................... 705/1, 705/17
See application file for complete search history.

(56) References Cited

U.S. PATENT DOCUMENTS 7,143,067 B1 * 11/2006 Cheston et al. ............... 705/59
2005/0076334 A1    4/2005 Demeyer ..................... 717/177

* cited by examiner

*Primary Examiner*—Janice A. Mooneyham
*Assistant Examiner*—Gerardo Araque, Jr.
(74) *Attorney, Agent, or Firm*—Hamilton & Terrile, LLP; Stephen A. Terrile (57) ABSTRACT

A method for a manufacturer of an information handling system to pay royalties for software preloaded onto an information handling system which includes determining when software that is preloaded onto the information handling system is executed by a user and paying a royalty for the software when the software is executed by the user so as to make the royalty payment based upon a point of use of the software is disclosed.

10 Claims, 6 Drawing Sheets

LICENSE ACTIVATION FOR PRELOADED SOFTWARE

BACKGROUND OF THE INVENTION

1. Field of the Invention

The present invention relates to information handling systems, and more particularly, to license activation for software that is preloaded onto information handling systems.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

It is known to manufacture information handling systems based on a build to order process that allows a customer to specify specific hardware and software options. It is also known to preload additional software (both operating systems and application programs) onto an information handling system when manufacturing the information handling system. With build to order information handling systems this additional software can be tailored to a particular customer based upon the specific hardware and software options selected by the customer when configuring the information handling system. It is also known to provide the software on some form of removable media (such as e.g., a CD-ROM or DVD) when providing the information handling system to the customer.

One example of an application that is preloaded onto an information handling system is a software DVD application. When an information handling system is fabricated with a DVD drive, the software DVD application allows an end user to play and view DVD content such as movies on the information handling system.

An issue relating to the preloading of software onto an information handling system relates to the licenses for the software and specifically to payment of the royalties to the providers of the software for the software licenses. Known methods of royalty payment often require that the royalties for the software license be paid for every information handling system that is provided to a customer with the particular software.

It is desirable to provide an automated process for determining when software that is preloaded onto an information handling system is actually executed by a user and to provide a process in which royalties are only paid for software that is actually executed by a user of the information handling system.

SUMMARY OF THE INVENTION

In accordance with the present invention, an automated process for determining when software that is preloaded onto an information handling system is actually executed by a user and to provide a process in which royalties are only paid for software that is actually executed by a user of the information handling system is disclosed. The automated process changes the license tracking, reporting and payment from a point of sale to a point of use. In one embodiment, the process determines when a component (either hardware or software) needed to use particular software is not present and if the component is not present, then a royalty payment is not necessary. Additionally, in one embodiment, the process determines if the software is not executed or activated and if the software is not executed or activated, then a royalty payment is not necessary.

In one embodiment, the invention relates to a method for a manufacturer of an information handling system to pay royalties for software preloaded onto an information handling system which includes determining when software that is preloaded onto the information handling system is executed by a user and paying a royalty for the software when the software is executed by the user so as to make the royalty payment based upon a point of use of the software.

In another embodiment, the invention relates to an apparatus for a manufacturer of an information handling system to pay royalties for software preloaded onto an information handling system which includes means for determining when software that is preloaded onto the information handling system is executed by a user and means for paying a royalty for the software when the software is executed by the user so as to make the royalty payment based upon a point of use of the software.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
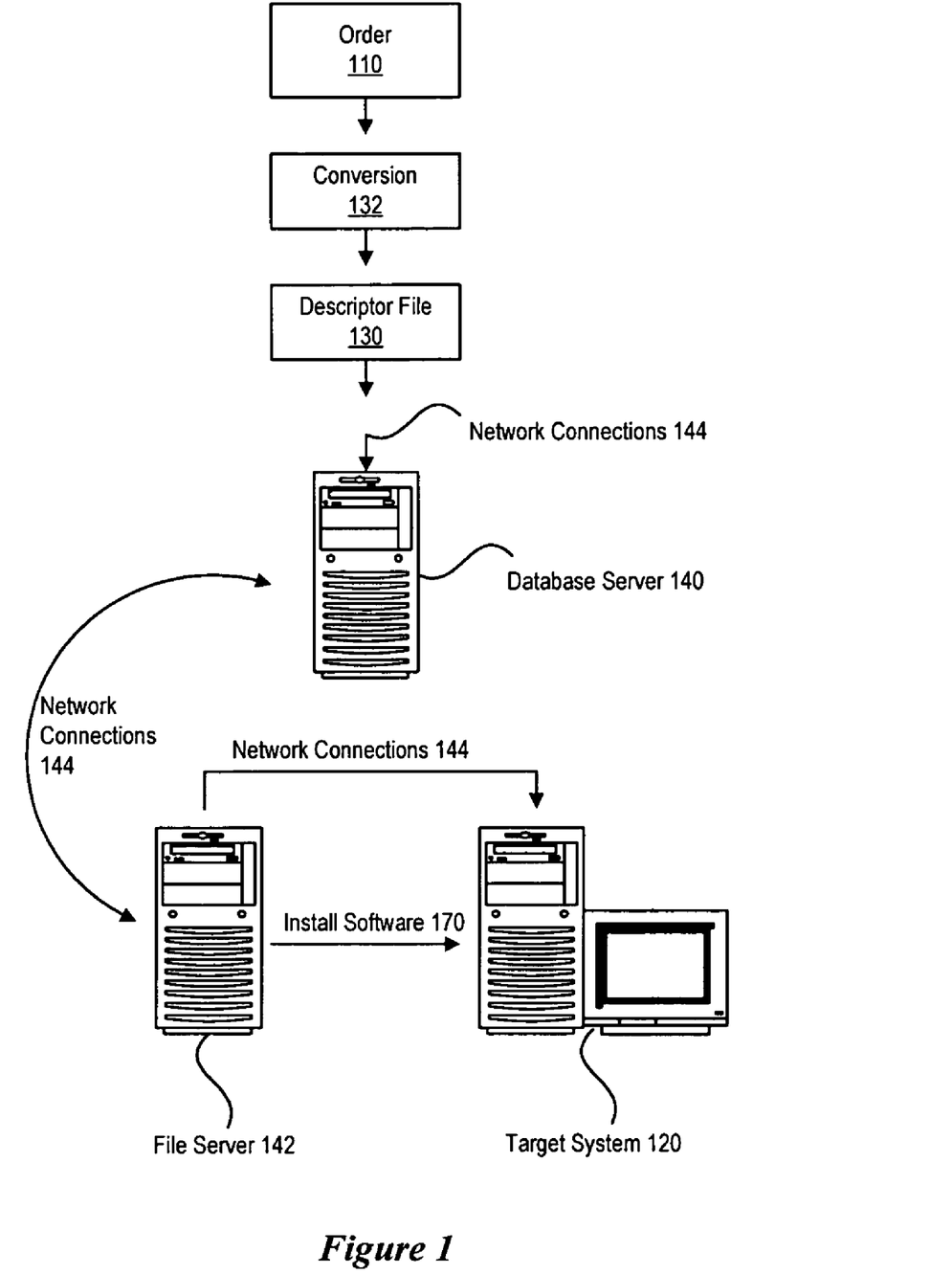
FIG. 1 shows an example of an automated build to order system for installing software on an information handling system.

Referring to FIG. 1, a schematic diagram of a software installation system 100 at an information handling system manufacturing site is shown. In operation, an order 110 is placed to purchase a target information handling system 120. The target information handling system 120 to be manufactured contains a plurality of hardware and software components. For instance, target information handling system 120 might include a certain brand of hard drive, a particular type of monitor, a certain brand of processor, and software. The software includes a particular version of an operating system along with all appropriate driver software and other application software along with appropriate software bug fixes.

Before the target information handling system 120 is shipped to the customer, the plurality of components are installed and tested from, for example, an image of the software. Such software installation and testing advantageously ensures a reliable, working information handling system which is ready to operate when received by a customer.

Because different families of information handling systems and different individual computer components require different software installation, it is necessary to determine which software to install on a target information handling system 120. A descriptor file 130 is provided by converting an order 110, which corresponds to a desired information handling system having desired components, into a computer readable format via conversion module 132. In one embodiment, the descriptor file 130 is a system descriptor record (SDR) file. The SDR file is a resource allocation file that includes text of which components are included within a particular information handling system.

Component descriptors are computer readable descriptions of the components of target information handling system 120 which components are defined by the order 110. In a preferred embodiment, the component descriptors are included in a descriptor file called a system descriptor record which is a computer readable file containing a listing of the components, both hardware and software, to be installed onto target information handling system 120. Having read the plurality of component descriptors, database server 140 provides a plurality of software components corresponding to the component descriptors to file server 142 over network connection 144. Network connections 144 may be any network connection well-known in the art, such as a local area network, an intranet, or the internet. The information contained in database server 140 is often updated such that the database contains a new factory build environment. The software is then installed on the target information handling system 120. The software installation is controlled by a software installation management server that is operable to control the installation of the operating system and other software packages specified by a customer.

The software installation includes a license module that automatically determines when software that is preloaded onto an information handling system is actually executed by a user. The license module then enables a manufacturer of the information handling system to pay royalties only for software that is actually executed by a user of the information handling system. The license module enables a manufacturer to change the license tracking, reporting and payment from a point of sale to a point of use. The license module may also determine when a component (either hardware or software) needed to use particular software is not present. If the component is not present, then a royalty payment is not necessary. Additionally, the module may determine if the software is not executed or activated. If the software is not executed or activated, then a royalty payment is not necessary.

Figure 2:
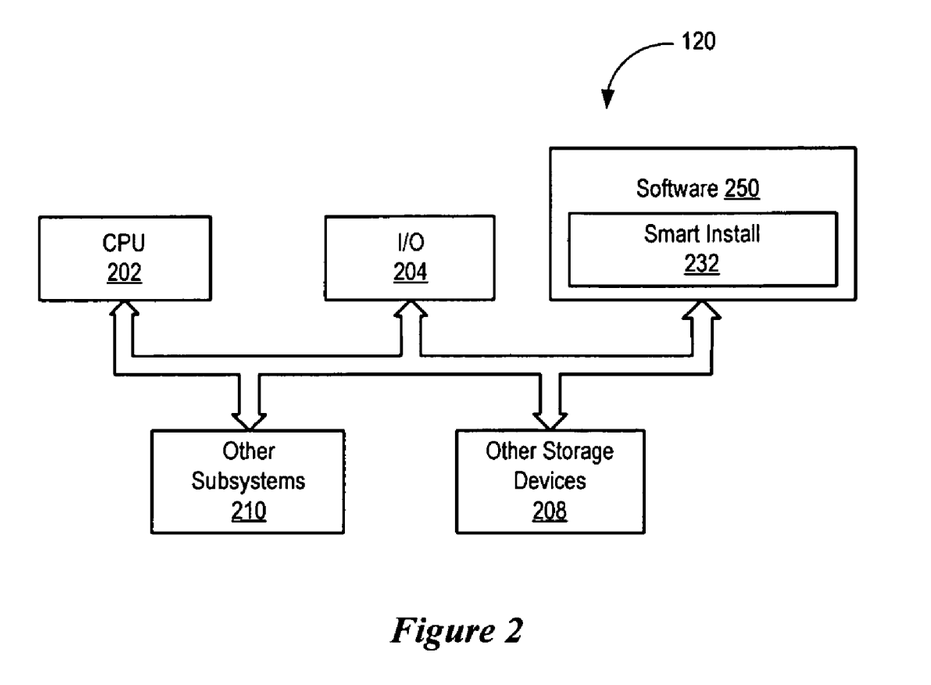
FIG. 2 is a system block diagram of an information handling system.

Referring to FIG. 2, a block diagram of an information handling system, such as the target information handling system 120 is shown. The information handling system includes a processor 202, input/output (I/O) devices 204, such as a display, a keyboard, a mouse, and associated controllers, non volatile memory 206 such as a hard disk drive, and other storage devices 208, such as a floppy disk and drive and other memory devices, and various other subsystems 210, all interconnected via one or more buses 212. The software is installed onto the non volatile memory 206. Alternately, the software may be installed onto any appropriate non-volatile memory. The non-volatile memory 206 stores applications 230 as well as a smart install module 232.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 3:
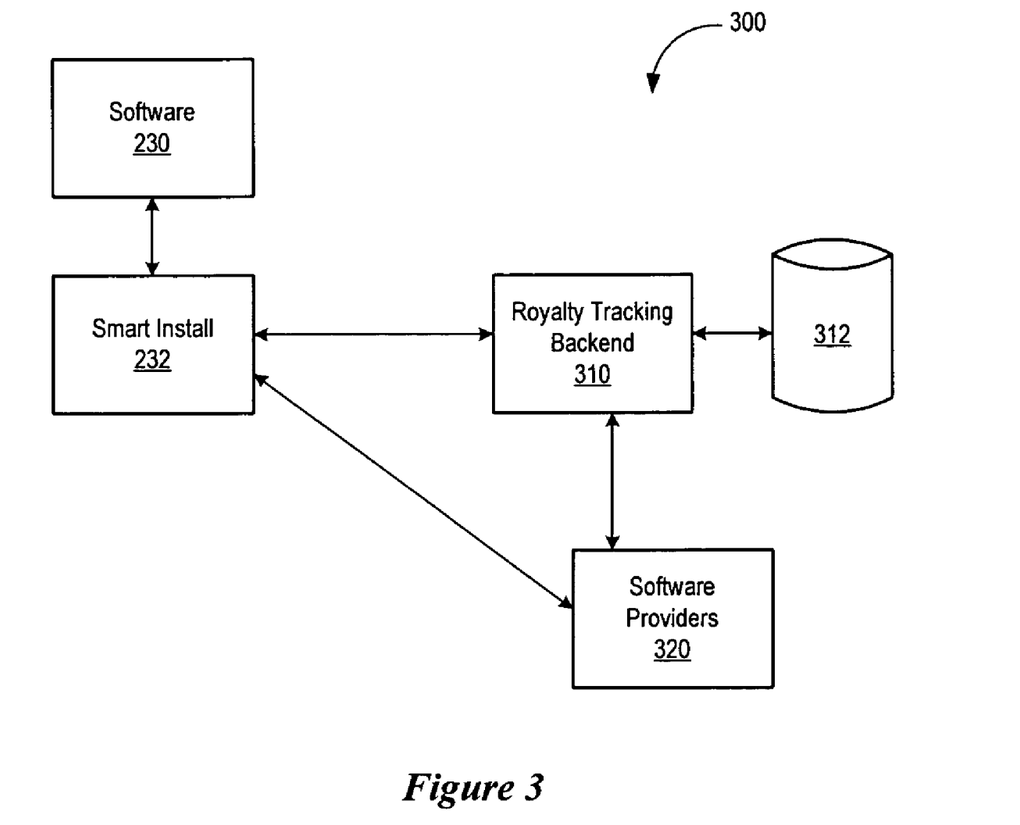
FIG. 3 shows a flow chart of a system for determining when software that is preloaded onto an information handling system is actually executed by a user.

Referring to FIG. 3, a flow chart of a system 300 for determining when software that is preloaded onto an information handling system is actually executed by a user and to provide a process in which royalties are only paid for software that is actually executed by a user of the information handling system is disclosed. The system 300 enables an information handling system manufacturer to change the license tracking, reporting and payment from a point of sale to a point of use. The system 300 determines when a component (either hardware or software) needed to use particular software is not present and if the component is not present, then a royalty payment is not necessary. Additionally, the system 300 determines if the software is not executed or activated and if the software is not executed or activated, then a royalty payment is not necessary.

The system includes a royalty tracking back end 310 as well as a royalty information database 312. The royalty tracking back end communicates with providers of software 320. The system 300 provides a validation function which prevents a manufacturer from double payment of royalties for a single piece of software or from additional payment of royalties for invalid information handling system configurations. The royalty tracking back end 310 interacts with a database 312 that stores information for all shipped information handling systems, the royalty tracking back end 312 accrues liability for all systems for which license royalties may be required, the royalty tracking back end 310 matches a service tag and date shipped against a list of valid configurations; the royalty tracking back end 312 matches a service tag and date shipped against a list of pre-activated systems. As a customer activates the software 230, the service tag is reported to the royalty tracking back end 310 via the smart install module 232 and matched against information stored within the database 312. The royalty tracking back end 310 identifies duplicate activations and removes the duplicate activations from any payment obligations that are sent to the provider of the software 320. The royalty tracking back end 310 identifies invalid configurations and removes the invalid configurations from any payment obligations that are sent to the provider of the software 320. The royalty tracking back end 310 identifies any pre-activations and new activations and matches these activations matched against royalty free introductory authorizations such as free three or six month offers.

Figure 4:
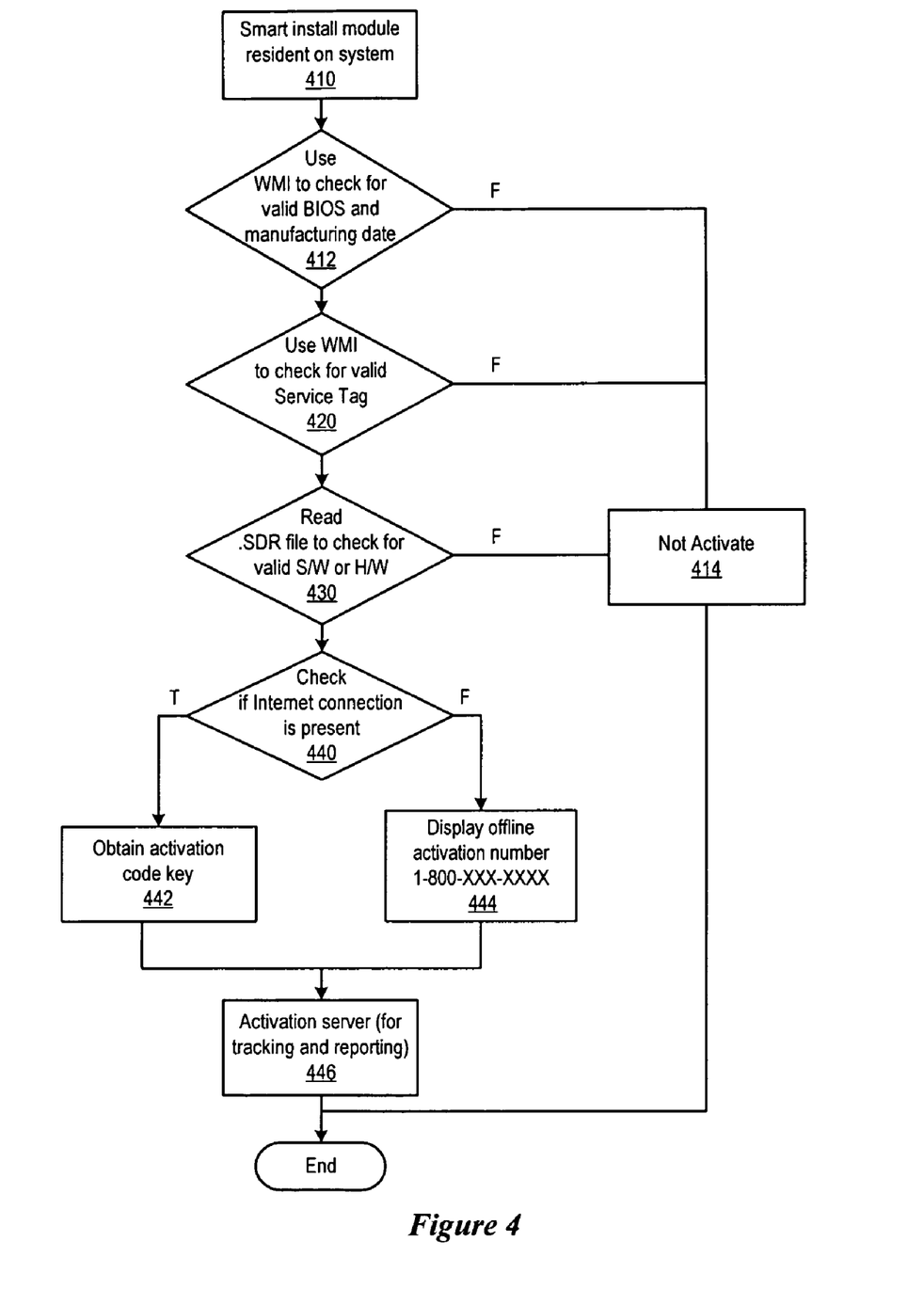
FIG. 4 shows a flow chart for a method for tracking software activation.

Referring to FIG. 4, a flow chart for a method for tracking software activation 400 is shown. The method for tracking software activation 400 provides a smart install module that allows for activation of the software when the appropriate component (hardware or software) is resident on the information handling system. The smart install module also provides a validation process that ensures a correct configuration. The validation is accomplished using an information handling system BIOS identifier, a service tag and a SDR file. Additionally, the smart install modules uses a windows management instrumentation (WMI) interface event tracking and a service tag executable file (SRVTAG.exe) to capture the BIOS identifier and the service tag. The smart install module uses the system specific BIOS identifier to identify the system as a valid system (i.e., a system that was manufactured by the manufacturer for which the manufacturer should pay the royalty for the preloaded application). The system specific service tag is used as the basis for reporting event information back to the manufacturer and to validate whether the configuration attempting to activate the license is valid. The system specific service tag is also used for royalty accounting tracking. The manufacturer specific SDR is used to validate the information handling system configuration as a valid configuration that contains the component for which the software is needed. A unique activation key is generated for each information handling system to activate (i.e., unlock) the license codes or components that are preloaded onto the information handling system. The activation process may be performed either automatically (e.g., via an online connection) or offline (e.g., via a telephone call).

More specifically, when a user of an information handling system initially executes a software application that is preloaded onto the information handling system, the smart install module 232 is accessed at step 410. The smart install module 232 determines whether the information handling system has a valid manufacturer BIOS and manufacturing date at step 412 by, e.g., a windows management instrumentation (WMI) interface accessing the BIOS information. The smart install module uses the system specific BIOS identifier to identify the system as a valid system (i.e., a system that was manufactured by the manufacturer for which the manufacturer should pay the royalty for the preloaded application). If the information handling system does not include a valid manufacturer BIOS and manufacturing date, then the smart install module 232 does not activate the software and presents a message to that effect at step 414 and the method completes execution.

If the information system includes a valid manufacturer BIOS and manufacturing date then the smart install module 232 determines whether the information handling system includes a valid service tag at step 420 by, e.g., the WMI interface accessing a service tag executable file. If the information handling system does not include a valid service tag, then the smart install module 232 does not activate the software and presents a message to that effect at step 414 and the method completes execution. The system specific service tag is used as the basis for reporting event information back to the manufacturer and to validate whether the configuration attempting to activate the license is valid. The system specific service tag is also used for royalty accounting tracking.

If the information handling system includes a valid service tag, then the smart install module 232 determines whether the components necessary for the software to execute are present in the information handling system at step 430 by, e.g., accessing a manufacturer specific system descriptor record. The manufacturer specific SDR is used to validate the information handling system configuration as a valid configuration that contains the component for which the software is needed. If the information handling system does not include the components necessary for the software, then the smart install module 232 does not activate the software and presents a message to that effect at step 414 and the method completes execution.

Next, the smart install module 232 obtains a unique activation key for the information handling system to activate (i.e., unlock) the license codes for the software that is preloaded onto the information handling system. The smart install module 232 first determines whether an internet connection is present at step 440. If an Internet connection is present then the smart install module automatically obtains the activation key at step 442. If an internet connection is not present, then the smart install module presents a telephone number via which the user may obtain the activation key offline at step 444. In either case, the user interacts with an activation server to obtain the activation key at step 446. The activation server also provides tracking and reporting functionality based upon the activation key.

Figure 5A:
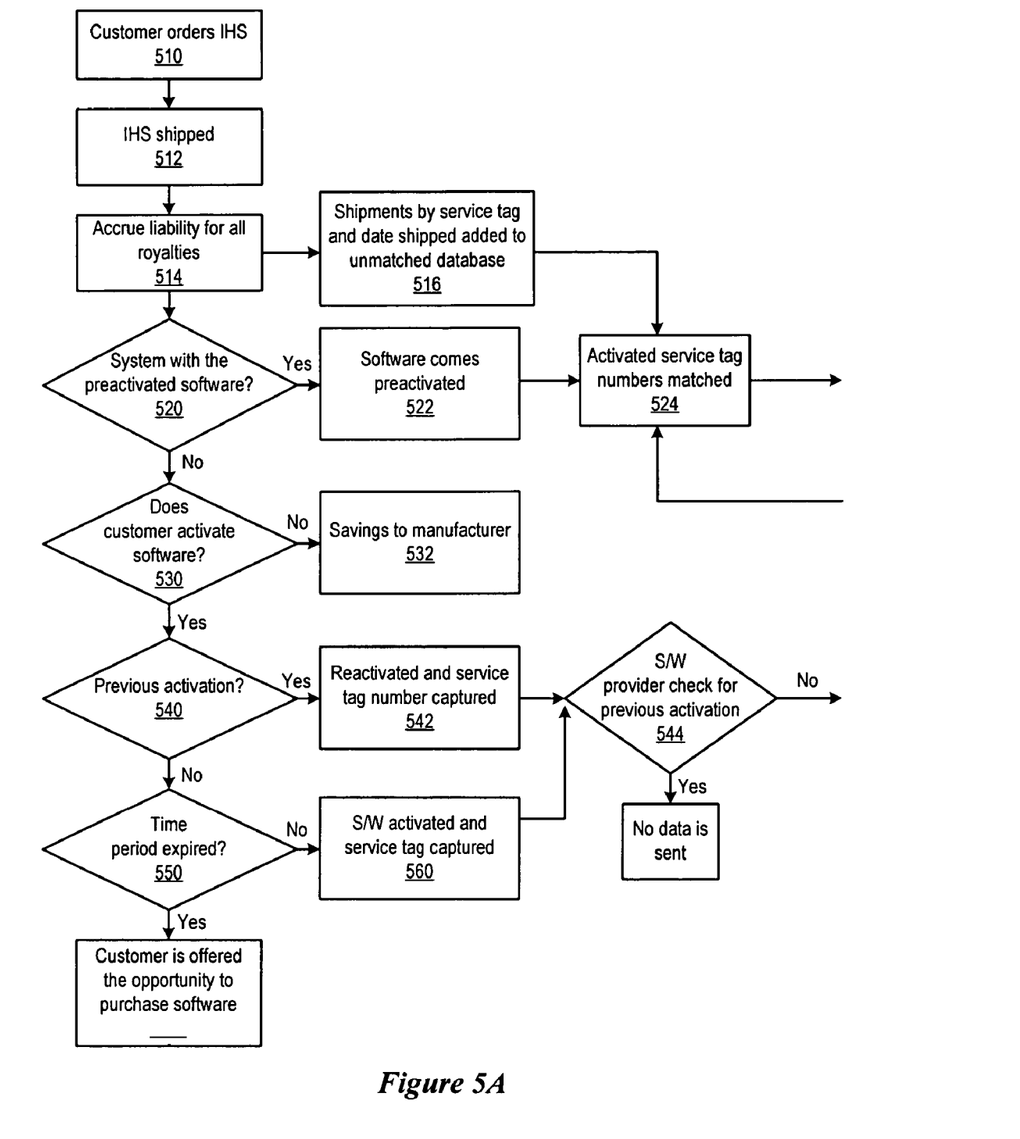
FIGS. 5A and 5B, generally referred to as FIG. 5, show a flow chart for a method for royalty accounting tracking and payment.
Figure 5B:
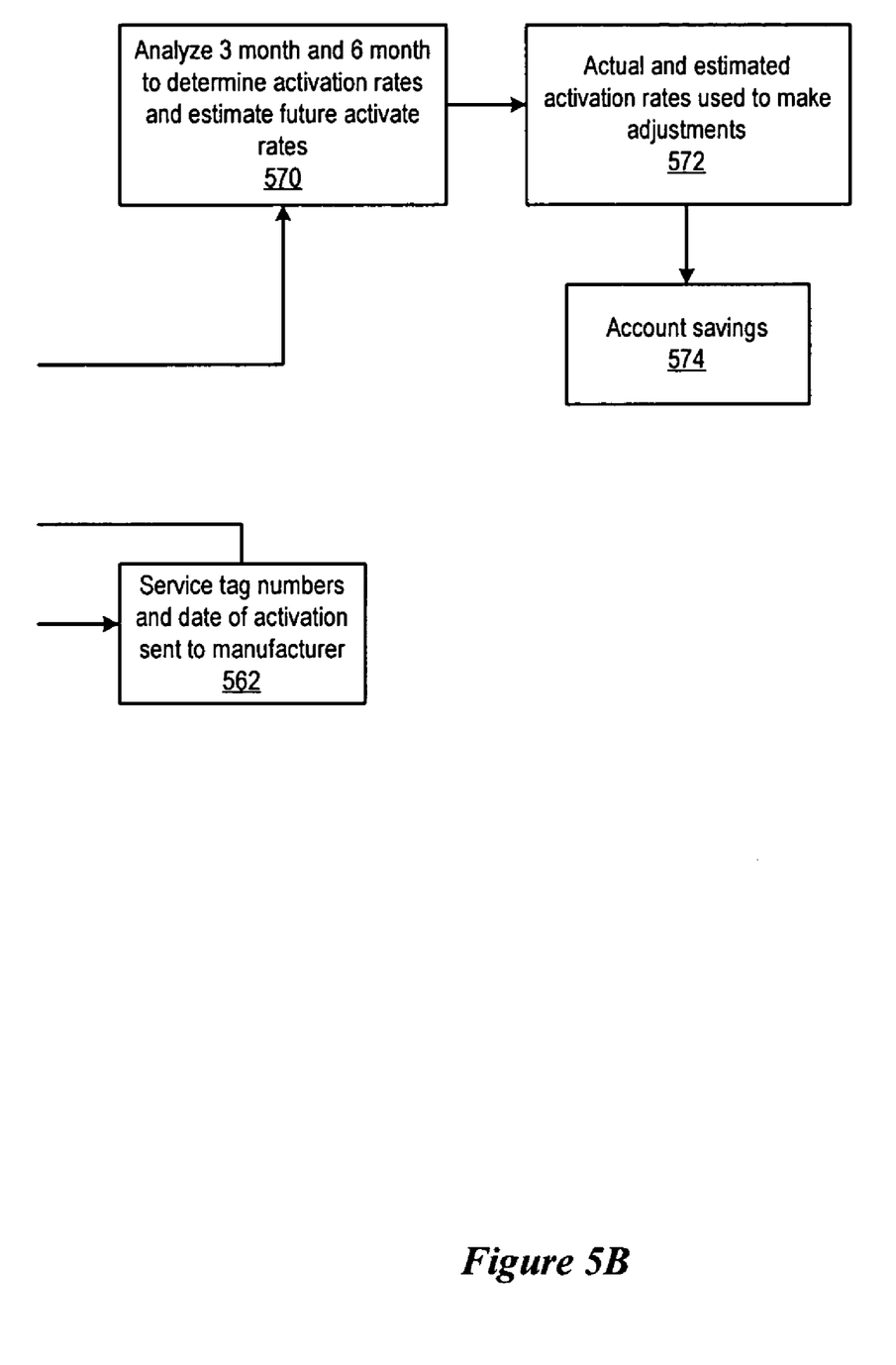

Referring to FIG. 5, a flow chart for a method for royalty accounting tracking and payment 500 is shown. The method for royalty accounting tracking and payment 500 provides a mechanism for accurately tracking the number of information handling systems that are shipped with software for which license royalties are due. The method uses an information part number to track and count every information handling system shipment. The information part number is associated with a software recovery vehicle (SRV) of the smart install module 232 of the information handling system.

The method for royalty accounting tracking and payment 500 provides a mechanism includes a reporting mechanism to ensure accurate tracking of activation of the software by a customer. The reporting mechanism is used for payment of royalties to the providers of the software. The reporting format may include a service tag, a number of installations for each service tag, an activation date and a manufacturing build date and a ship date. The reporting format may use standard electronic data interchange (EDI) protocols such as a simple mail transfer protocol (SMTP), value added network (VAN), frame relay, secure file transfer protocol (FTP) or Applicability Statement 2 (AS2). The reporting format may be an EDI document format such as e.g., EDI 861 or EDI 862.

The method for royalty accounting tracking and payment 500 provides a validation mechanism which prevents a manufacturer from double payment of royalties for a single piece of software or from additional payment of royalties for invalid information handling system configurations. The royalty tracking back end interacts with a database that stores information for all shipped information handling systems, the royalty tracking back end accrues liability for all systems for which license royalties may be required, the back end system matches a service tag and date shipped against a list of valid configurations; the back end system matches a service tag and date shipped against a list of pre-activated systems. As a customer activates the software, the service tag is reported to the back end system and matched against information stored within the database. The back end system identifies duplicate activations and removes the duplicate activations from any payment obligations that are sent to the provider of the software. The back end system identifies invalid configurations and removes the invalid configurations from any payment obligations that are sent to the provider of the software. The back end system identifies any pre-activations and new activations and matches these activations matched against royalty free introductory authorizations such as free three or six month offers.

More specifically, the method for royalty accounting tracking and payment 500 starts when a customer orders an information handling system that includes components for which royalty information is tracked at step 510. For example, a customer might order an information handling system which includes a DVD player. Next, the information handling system is fabricated and shipped to the customer at step 512. The information handling system is fabricated to include the component as well as the software necessary for the component. For example, the information handling system might include software for operating the DVD player ordered by the customer.

When the order ships, the method 500 accrues liability for the royalty at step 514 and the shipped information handling system is added to the database 312 using information including the date that the information handling system was shipped and the service tag of the information handling system at step 516.

Next the method 500 determines whether the information handling system is a system in which the software is pre-activated at step 520. When the method determines that the software has been pre-activated (step 522) then the activated service tag numbers are matched with the software in the database 312 (i.e., the database stores information indicating that the software within the information handling system has been activated.) at step 524.

If the software was not pre-activated, then the method 500 determines whether the customer has activated the software at step 530. If the customer does not activate the software, then the manufacturer obtains a savings in that the manufacturer does not have to pay the software provider for royalties for the software (step 532).

If the customer activates the software, then the method determines whether the software has been previously activated at step 540. If the software was previously activated, then the software is reactivated and the service tag is captured at step 542. Next the software provider 320 checks for information regarding the previous activation at step 544. If the software provider 320 determines that there was a previous activation, then the manufacturer is not billed for the additional activation and thus does not incur an additional royalty obligation. Additionally, the royalty tracking back end identifies the duplicate activations and removes the duplicate activations from any payment obligations that are sent to the software provider 320.

Next, if the software was not previously activated, then the method 500 determines whether a predetermined time period has expired at step 550. If the predetermined time period had expired, then the customer is offered an opportunity to purchase a new version of the software at step 552. For example, certain software may only have three years to be activated, after which time the customer would be required to purchase a new version of the software.

If the predetermined time period has not expired, then the software is activated at step 560 and the service tag of the information handling system on which the software is loaded is captured. Next the software provider checks for previous activations at step 544. If the software provider determines that there were no previous activations, then the service tan information and date of activation are provided to the manufacturer at step 562 and the activated service tag information stored within the database 312.

After the activated service tag information is stored within the database 312 the method 500 can use this information to analyze activation rates over certain periods of time (such as e.g., three months and six months) at step 570. The actual and estimated activation rates may be used to make adjustments to balance sheet information which is based upon activation charges at step 572. Accordingly, the method 500 provides accounting savings at step 574.

OTHER EMBODIMENTS

Other embodiments are within the following claims.

For example, while specific applications are identified, other applications are also contemplated.

Also for example, the above-discussed embodiments include software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably or remotely coupled to a microprocessor/memory system. Thus, the modules may be stored within a computer system memory to configure the computer system to perform the functions of the module. Other new and various types of computer-readable storage media may be used to store the modules discussed herein. Additionally, those skilled in the art will recognize that the separation of functionality into modules is for illustrative purposes. Alternative embodiments may merge the functionality of multiple modules into a single module or may impose an alternate decomposition of functionality of modules. For example, a software module for calling sub-modules may be decomposed so that each sub-module performs its function and passes control directly to another sub-module.

Consequently, the invention is intended to be limited only by the spirit and scope of the appended claims, giving full cognizance to equivalents in all respects.

What is claimed is:

1. A method for a manufacturer of an information handling system to pay royalties for software preloaded onto an information handling system comprising:
   determining when software that is preloaded onto the information handling system is executed by a user;
   paying a royalty for the software when the software is executed by the user so as to make the royalty payment based upon a point of use of the software; and,
   determining when a component needed to use the software is not present in the information handling system and if the component is not present, then not paying the royalty.

2. The method of claim 1 wherein:
   the determining is based upon a system descriptor record.

3. The method of claim 1 wherein
   the determining when software that is preloaded onto the information handling system is executed is based upon when the software is activated; and
   the paying the royalty for the software occurs only when the software is activated by the user.

4. The method of claim 1 wherein:
   the determining includes determining whether the software that is preloaded onto the information handling system was pre-activated.

5. The method of claim 1 further comprising:
   providing the information handling system with a smart install module, the smart install module determining when the software that is preloaded onto the information handling system is executed.

6. An apparatus for a manufacturer of an information handling system to pay royalties for software preloaded onto an information handling system comprising:

means for determining when software that is preloaded onto the information handling system is executed by a user;

means for paying a royalty for the software when the software is executed by the user so as to make the royalty payment based upon a point of use of the software; and,     means for determining when a component needed to use the software is not present in the information handling system and if the component is not present, then not paying the royalty.

7. The apparatus of claim 6 wherein:
the determining is based upon a system descriptor record.

8. The apparatus of claim 6 wherein
the determining when software that is preloaded onto the information handling system is executed is based upon when the software is activated; and the paying the royalty for the software occurs only when the software is activated by the user.

9. The apparatus of claim 6 wherein:
the determining includes determining whether the software that is preloaded onto the information handling system was pre-activated.

10. The apparatus of claim 6 wherein:
the information handling system includes a smart install module, the smart install module determining when the software that is preloaded onto the information handling system is executed.

\* \* \* \* \*